(12) United States Patent
Paschedag et al.

(10) Patent No.: US 8,512,560 B2
(45) Date of Patent: Aug. 20, 2013

(54) FILTER PRESS

(75) Inventors: Thomas Paschedag, Dohlau (DE);
Marion Bohme, Dusseldorf (DE)

(73) Assignee: Andritz Technology and Asset Management GmbH, Graz (AT)

( * ) Notice: Subject to any disclaimer, the term of this patent is extended or adjusted under 35 U.S.C. 154(b) by 284 days.

(21) Appl. No.: 12/808,278

(22) PCT Filed: Dec. 2, 2008

(86) PCT No.: PCT/AT2008/000427
§ 371 (c)(1),
(2), (4) Date: Jun. 15, 2010

(87) PCT Pub. No.: WO2009/079673
PCT Pub. Date: Jul. 2, 2009

(65) Prior Publication Data
US 2011/0147296 A1    Jun. 23, 2011

(30) Foreign Application Priority Data

Dec. 20, 2007    (AT) ................................ A 2082/2007

(51) Int. Cl.
*B01D 25/19*    (2006.01)
*B01D 25/12*    (2006.01)

(52) U.S. Cl.
USPC ............. 210/230; 210/91; 210/231; 210/227; 210/236

(58) Field of Classification Search
USPC ................... 210/224–231, 91, 236, 237, 330, 210/332, 388, 350, 385, 204; 100/295–297, 100/214, 226, 232, 229 R, 269.12, 197, 198, 100/194, 199
See application file for complete search history.

(56) References Cited

U.S. PATENT DOCUMENTS

| | | | | |
|---|---|---|---|---|
| 4,032,450 A | * | 6/1977 | Iwatani | 210/230 |
| 4,107,042 A | * | 8/1978 | Heinrich et al. | 210/225 |
| 4,511,469 A | * | 4/1985 | Iwatani | 210/225 |
| 4,591,435 A | * | 5/1986 | Pryadkin et al. | 210/230 |
| 4,756,817 A | | 7/1988 | Hicks | |
| 4,855,062 A | * | 8/1989 | Oelbermann | 210/739 |
| 5,368,751 A | * | 11/1994 | Glendinning | 210/791 |
| 5,846,415 A | | 12/1998 | Tsuchida et al. | |
| 5,855,778 A | * | 1/1999 | Hutchison et al. | 210/225 |
| 2008/0230461 A1 | * | 9/2008 | Schulte et al. | 210/231 |

FOREIGN PATENT DOCUMENTS

| | | |
|---|---|---|
| DE | 3245210 | 6/1984 |
| GB | 407782 | 3/1934 |
| GB | 681560 | 10/1952 |
| JP | 61209018 A * | 9/1986 |

* cited by examiner

*Primary Examiner* — David C Mellon
(74) *Attorney, Agent, or Firm* — Roylance, Abrams, Berdo & Goodman, L.L.P.

(57) ABSTRACT

A filter press includes a press frame containing side beams (2) to support filter plates (17) movably along the longitudinal axis of the side beams (2). The filter plates (17) are oriented at right angles to the longitudinal axis of the side beams (2) and connected to one another. A pressure plate (4) can be moved along the longitudinal axis of the side beams (2) by a pushing or pulling device, and which presses the filter plates of the sliding carriage (3) against one another during the filtration process. The pushing or pulling device is mounted on a sliding carriage (3) that can be moved on the side beams (2) along the longitudinal axis of the side beams (2) by a drive unit mounted on the sliding carriage (3).

24 Claims, 4 Drawing Sheets

FILTER PRESS

BACKGROUND OF THE INVENTION

The invention relates to a filter press with a press frame to support filter plates movably along the longitudinal axis of the press frame, where the filter plates are oriented at right angles to the longitudinal axis of the press frame and connected to one another, and where a pressure plate is provided that can be moved along the longitudinal axis of the press frame by means of pushing or pulling equipment and which presses the filter plates against one another during the filtration process.

Filter presses of this kind are used to separate solids from the liquid phase of a suspension to be filtered. This filtration process takes place in the filter plates, where several filter plates are joined to one another to form a filter plate assembly. With the aid of a closing cylinder, usually a hydraulic closing cylinder, pressure is applied to the filter plate assembly in order to guarantee the necessary leak-tightness between the individual filter plates. Each of the filter plates has a filter area covered with a filter cloth, where the suspension to be filtered is pressed into the filter chamber formed between two filter plates and against the filter cloth. The filtrate between the filter cloth and the filter area is then carried off, and the filter cake remains in the filter chamber. The filter cake drops out when the filter plates are separated from one another.

In some applications, for example in mining, the cycle times are very short, which means that closing of the filter plate assembly, filling with the suspension to be filtered, the filtration process itself, opening of the filter plate assembly, discharge of the filter cake, and washing of the filter cloths all have to proceed relatively quickly, often within a few minutes. A delaying factor here is opening and closing of the filter plate assembly. In order to accelerate this process, the filter plates are connected to one another using chains, for example, so that the entire filter plate assembly is pulled apart when the outermost filter plate is moved and the entire filter cake can drop out. Compared with moving one filter plate after another, this method requires a longer filter plate travel path. According to the state of the art, the closing cylinder, for example, is also used to pull the filter plate assembly apart, however this entails some disadvantages. If the closing cylinder is used, for example, the press volume is limited because only one limited cylinder stroke can be realized. A long cylinder stroke also necessitates large quantities of oil and exposes large areas of the closing cylinder piston rod to contamination from falling filter cake. In addition, there are also disadvantages from radial forces and other unfavourable loads on the piston rod, the piston, and the respective seals. Lastly, opening and closing the filter plate assembly using the closing cylinder takes considerable time because the closing cylinder is designed for high closing pressure, but not for rapid piston movement.

Thus, attempts were also made to provide additional hydraulic drives for opening and closing the filter plate assembly and which were designed for a long and rapid cylinder stroke. The correspondingly thin piston rods, however, cause problems due to their low mechanical loading capacity, and it is often necessary to use several additional hydraulic drives of this kind, which have to be controlled exactly however, in order to ensure synchronous movement. Ultimately, these systems also do not solve the problem of long piston rods and their being contaminated by falling filter cake.

SUMMARY OF THE INVENTION

The aim of the invention is thus to avoid these disadvantages and to realize a filter press that provides the necessary closing pressure for the filter plate assembly on the one hand, but also permits rapid opening and closing of the filter plate assembly on the other hand. In addition, the filter press according to the invention should offer improved protection against contamination of mechanical components like the closing cylinder, or of equipment for opening and closing the filter plate assembly.

These objectives are achieved by a filter press with press frame containing side beams to support filter plates movably along the longitudinal axis of the side beams, where the filter plates are oriented at right angles to the longitudinal axis of the side beams and connected to one another, and where a pressure plate is provided that can be moved along the longitudinal axis of the side beams by means of a pushing or pulling device, and which presses the filter plates against one another during the filtration process. The invention suggests that the pushing or pulling device is mounted on a sliding carriage that can be moved on the side beams along the longitudinal axis of the side beams by means of a drive unit mounted on the sliding carriage. When the filter plates are in place, the filter plate closest to the pressure plate can be connected to the pressure plate, and thus the filter plates can be moved farther apart or closer together by moving the sliding carriage. Due to the feature of the separate sliding carriage, the kinematic process of pressing the filter plates together by means of the pushing and pulling device is uncoupled from the process of opening and closing the filter plate assembly. Since the drive unit is mounted on the sliding carriage, contamination of mechanical components, such as the pushing or pulling device, or of the drive unit itself, is avoided.

The drive unit can have various designs. For example, the drive unit comprises at least one gear wheel, which meshes with a toothed rack mounted on the side beams. This provides a simple mechanical solution for the drive unit and also permits high speeds by the sliding carriage. If the teeth of the toothed rack are facing downwards, this orientation of the toothed rack can reduce contamination of the rack and pinion gear caused by falling filter cake. The pushing or pulling device can have a hydraulic drive with a hydraulic cylinder, where both the hydraulic drive and the hydraulic cylinder are mounted on the sliding carriage. Thus, supply facilities for the pushing or pulling device, such as hydraulic supply lines, can be kept short.

The sliding carriage can have at least one interlocking cylinder that interacts with a recess in the press frame in the vicinity of the closed filter plate assembly. The at least one interlocking cylinder thus supports the sliding carriage at the side beams of the press frame when the pushing or pulling device moves the pressure plate in order to press the filter plates against one another. A limit stop that ensures exact positioning of the sliding carriage can be provided in the vicinity of the closed filter plate assembly to align the interlocking cylinder with recesses in the side beams.

The side beams can have recesses where the sliding carriage has lateral press rolls that roll along the side of the side beams facing away from the sliding carriage. The lateral press rolls thus prevent the side beams from being bent outwards when the interlocking cylinders are extended. As a supplement, additional press rolls can also be provided that roll along the side of the beams facing the sliding carriage in order to prevent the side beams from being bent inwards when the interlocking cylinder is retracted.

Proximity switches can be mounted at a starting position of the sliding carriage in the vicinity of the closed filter plate assembly and in a final position of the sliding carriage when the filter plate assembly is open. The proximity switches detect the position of the sliding carriage and control acceleration and braking thereof. As a result, movement of the sliding carriage can be optimized.

BRIEF DESCRIPTION OF THE DRAWINGS

The invention will now be described in more detail on the basis of an embodiment example with the aid of the attached drawings. Here.

DETAILED DESCRIPTION OF AN EXEMPLARY EMBODIMENT

Figure 1:
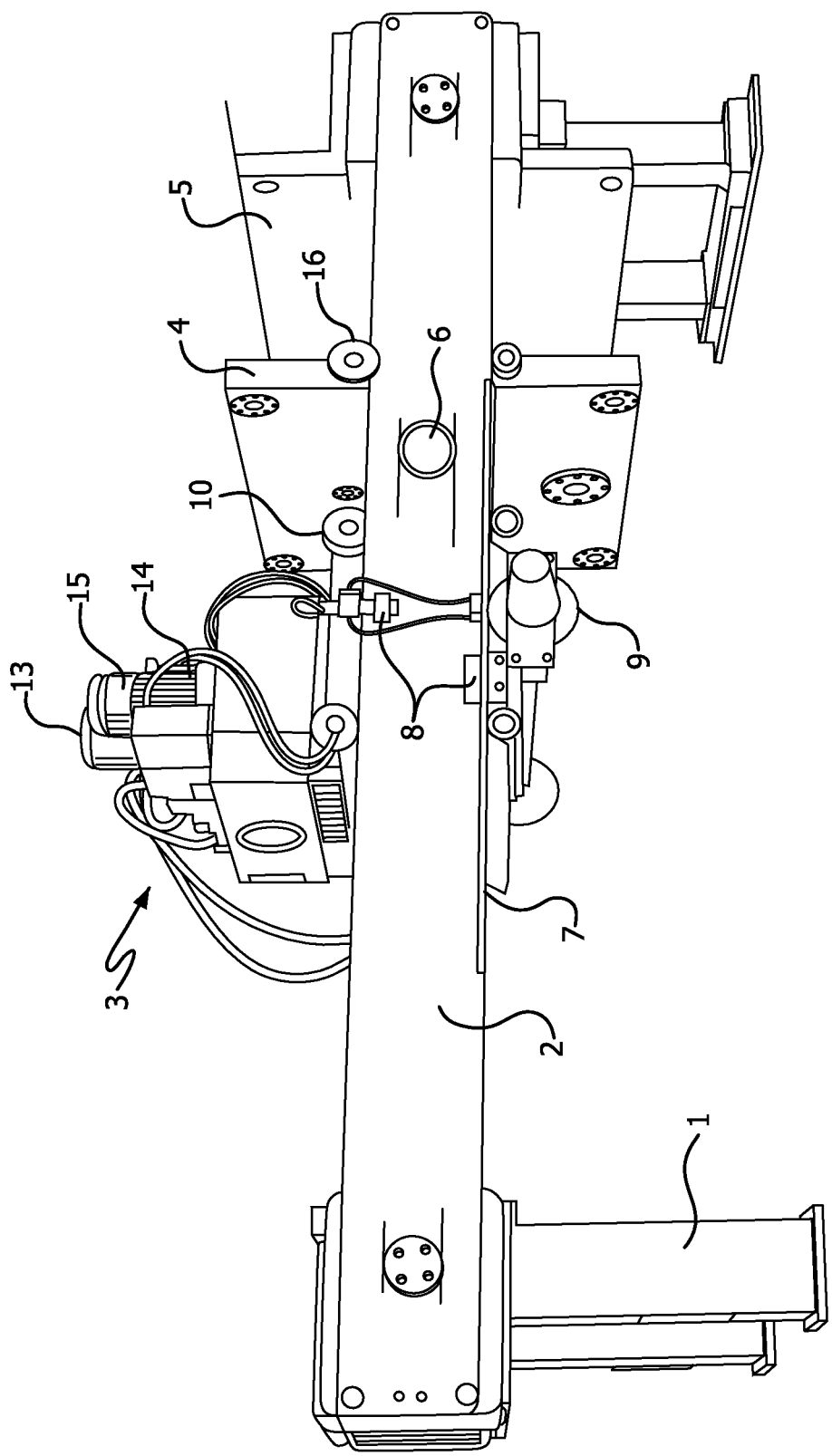
FIG. 1 shows a perspective view of an embodiment of a filter press according to the invention without the filter plates mounted.
Figure 6:
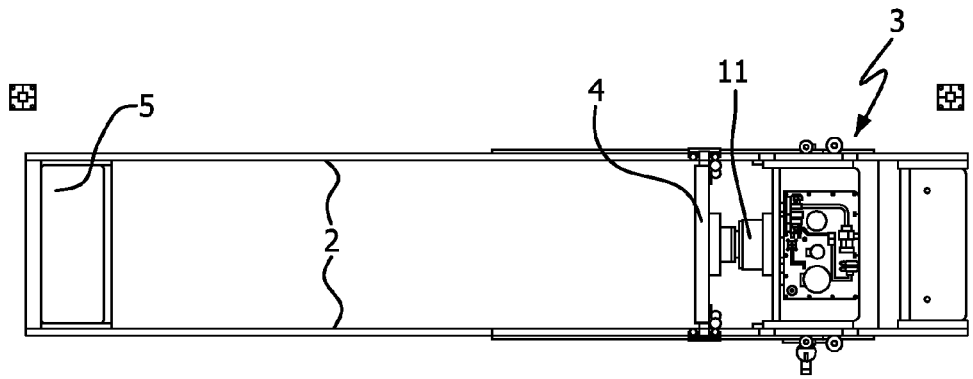
FIG. 6 shows the embodiment of a filter press according to the invention, as shown in FIG. 1, seen from above (without filter plates).

FIG. 1 shows a perspective view of an embodiment of a filter press according to the invention, with a press frame containing end columns 1, side beams 2, as well as a header 5 at the end of the side beams 2, where the header 5 serves in particular to absorb the pressing and tensile forces occurring during manipulation of the filter plate assembly 18. In addition, there is a pressure plate 4 mounted in a movable support running along the longitudinal axis of the side beams 2 with the aid of supporting rollers 16. The filter plate assembly 18, which is not shown in FIGS. 1-3 and in FIG. 6, is located between the pressure plate 4 and the header 5. The supply lines required for filtration in order to feed in the suspension to be filtered and carry away the filtrate are laid through the header 5.

According to the invention there is also a sliding carriage 3 on the side beams 2, which is carried on guide rollers 10. The sliding carriage 3 can be moved along the longitudinal axis of the side beams 2 with the aid of a drive unit mounted on the sliding carriage 3. In the present embodiment, the drive unit comprises at least one gear wheel 9 that meshes with at least one toothed rack 7 mounted on the side beams 2 (see also FIG. 3, FIG. 4 and FIG. 5). The gear wheel 9 is activated via a hydraulic motor 14, for example, which is also mounted on the sliding carriage 3. With this simple arrangement, the sliding carriage 3 can travel at high speeds.

On the sliding carriage 3 there is also a pushing and pulling device, formed in the present case by a hydraulic closing cylinder 11 and a hydraulic drive 13. The corresponding hydraulic drive 13 is also mounted on the sliding carriage 3, with the result that the supply lines can be kept very short. This reduces the risk of leaks and avoids long lines being laid from external hydraulic drives. FIG. 1 also shows a hydraulic motor 15 including a first motor for large quantities of oil and correspondingly lower pressure, as well as a second motor for smaller quantities of oil and greater pressure. The first motor is used for interlocking, as will be described in more detail, and for lower closing pressure of the closing cylinder, and the second motor is used to build up high closing pressure by the closing cylinder, as is required during filtration.

Figure 2:
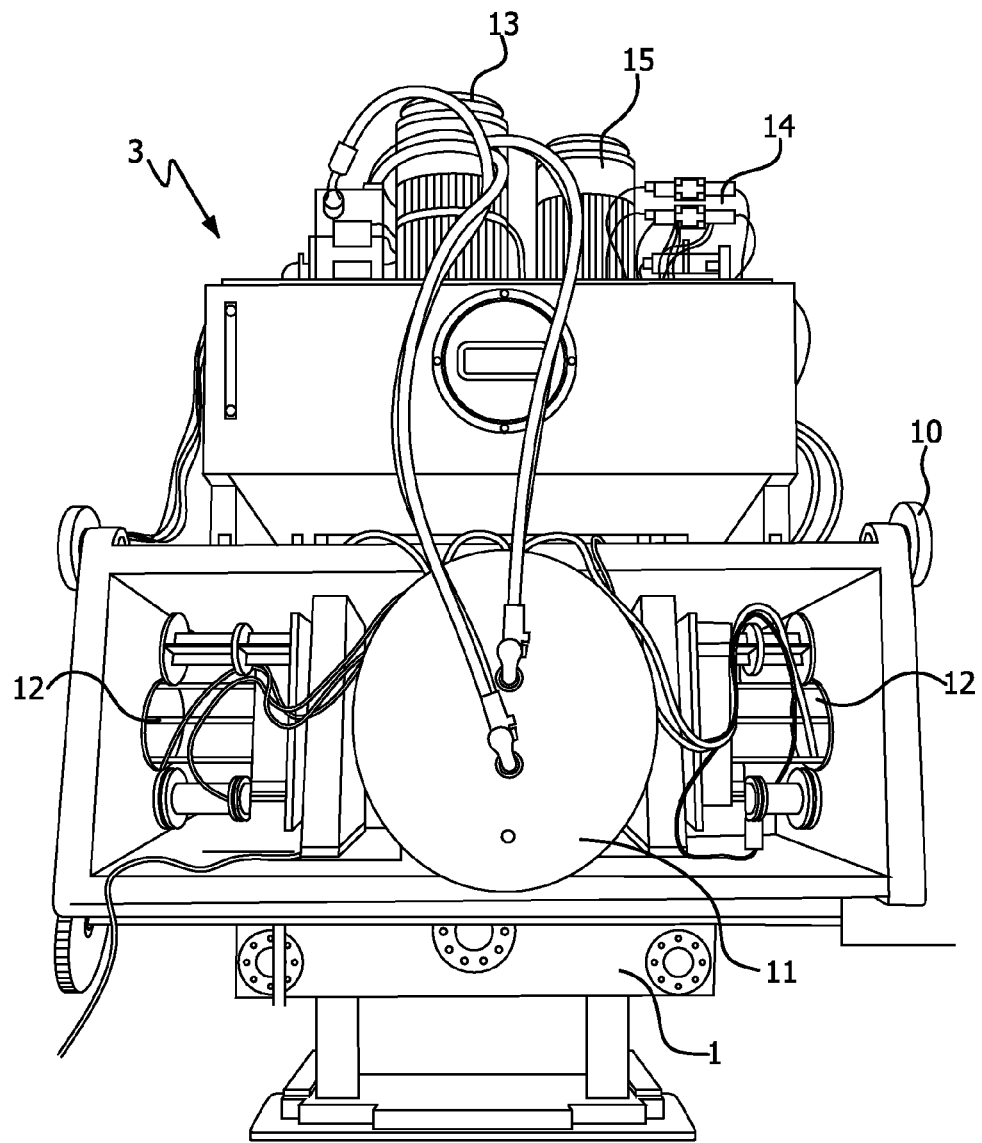
FIG. 2 shows a perspective view of the sliding carriage, as seen from the side facing away from the pressure plate.
Figure 3:
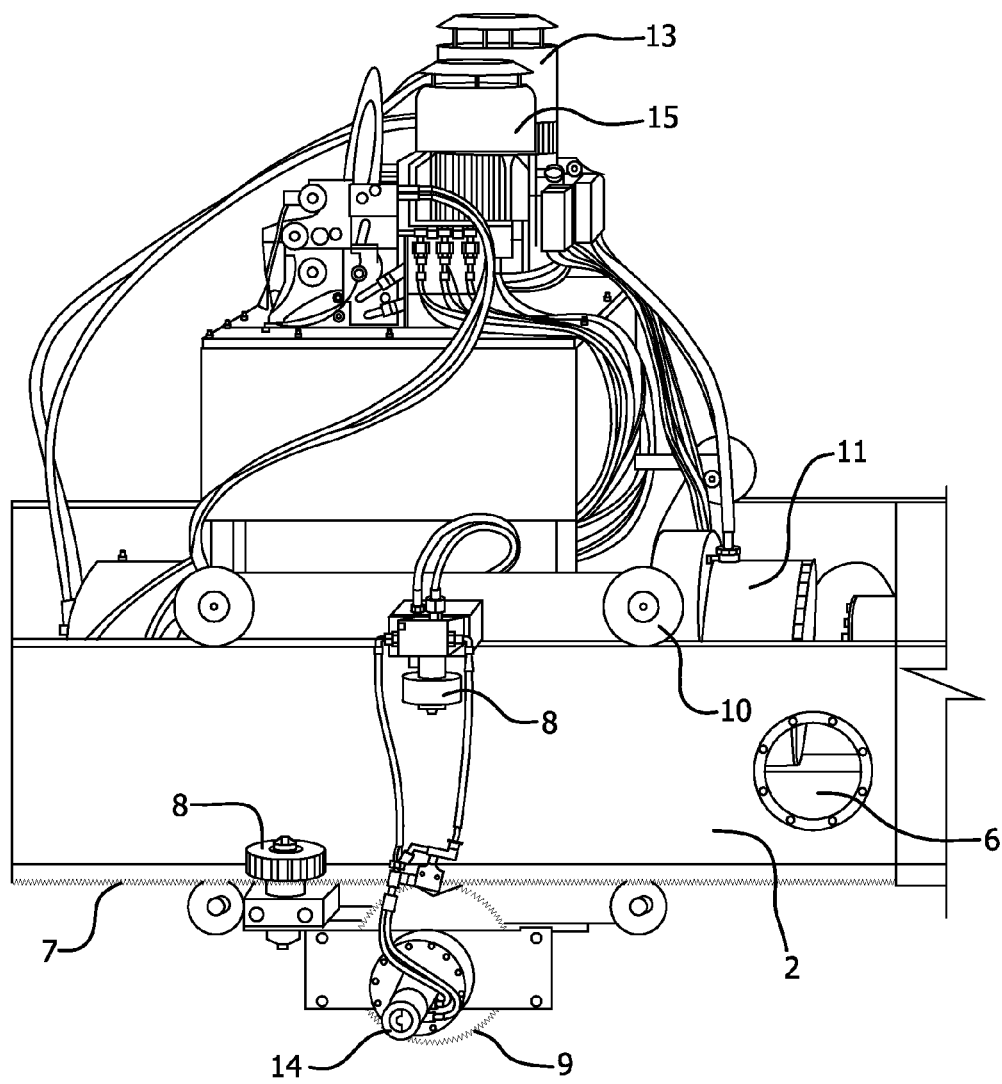
FIG. 3 shows a side view of the sliding carriage.

In the side beams 2, recesses 6 are provided close to the closed filter plate assembly that interact with the pistons of the interlocking cylinders 12 mounted on both sides of the sliding carriage 3 (see also FIG. 2). The interlocking cylinders 12 are activated via an interlocking hydraulic system and support the sliding carriage 3 at the side beams 2 of the press frame when the pushing or pulling device moves the pressure plate 4 in order to press the filter plates 17 against one another. The recesses 6 can be designed as bronze bushes, for example, that are inserted into the side beams 2.

In addition, a limit stop can be provided in the vicinity of the closed filter plate assembly 18 (not shown in FIGS. 1-6) to ensure exact positioning of the sliding carriage 3 in order to align the interlocking cylinder 12 correctly with the recesses 6 in the side beams 2. The piston rods of the interlocking cylinders 12 can thus mesh exactly with the recesses 6. Furthermore, the sliding carriage 3 can be provided with lateral press rolls 8 that roll along the side of the side beams 2 facing away from the sliding carriage in order to cause the side beams 2 to bend outwards when the interlocking cylinders 12 are extended.

Movement of the sliding carriage 3 can also be optimized with the aid of proximity switches. Here, the proximity switches are arranged at a starting position of the sliding carriage 3 in the vicinity of the closed filter plate assembly 18 and in a final position of the sliding carriage 3 when the filter plate assembly 18 is open, and they cause the sliding carriage 3 to brake and accelerate, respectively, when the sliding carriage 3 is detected.

The filter press according to the invention now functions as follows:

The sliding carriage 3 is located first of all in an outer position farthest away from the header 5—the starting position—and emits a control signal to accelerate the sliding carriage 3 via the hydraulic motor 14. The sliding carriage 3 now moves towards the header 5 and closes the filter plate assembly 18 as it does so. Finally, a proximity switch detects the position of the sliding carriage 3 in an inner position close to the header 5—the final position—and emits a control signal to brake the sliding carriage 3 via the hydraulic motor 14.

Figure 4:
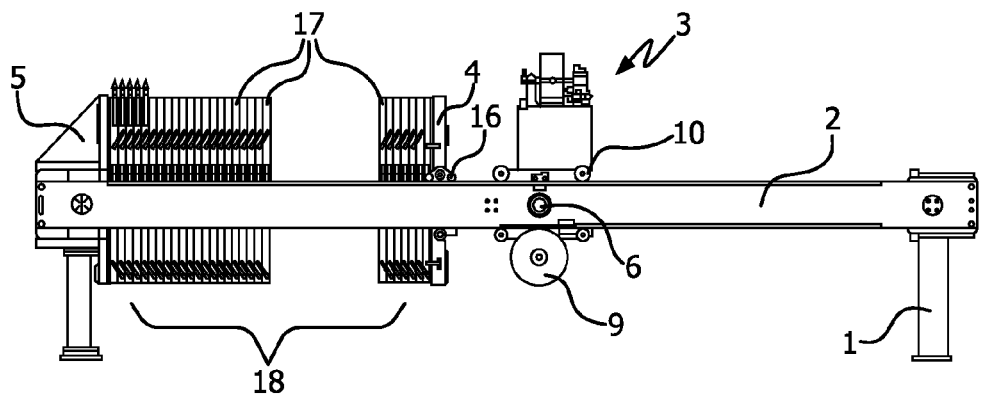
FIG. 4 shows a side view of the embodiment of a filter press according to the invention as shown in FIG. 1, during the filtration process.

The sliding carriage 3 is positioned precisely in its final position using a limit stop. A control signal to the interlocking hydraulics subsequently causes the piston rods of the interlocking cylinders 12 to extend in such a way that their piston rods mesh into the recesses 6. A further control signal to the hydraulic drive 13 activates extension of the piston of the hydraulic cylinder 11 in order to apply closing pressure to the closed filter plate assembly 18 via a pressure plate 4 (FIG. 4). The filter plate assembly 18 is now ready for filtration. During filtration the filtrate is drained off through pipes that run through the header 5, and a filter cake builds up between the filter plates 17 that has later to be removed.

Figure 5:
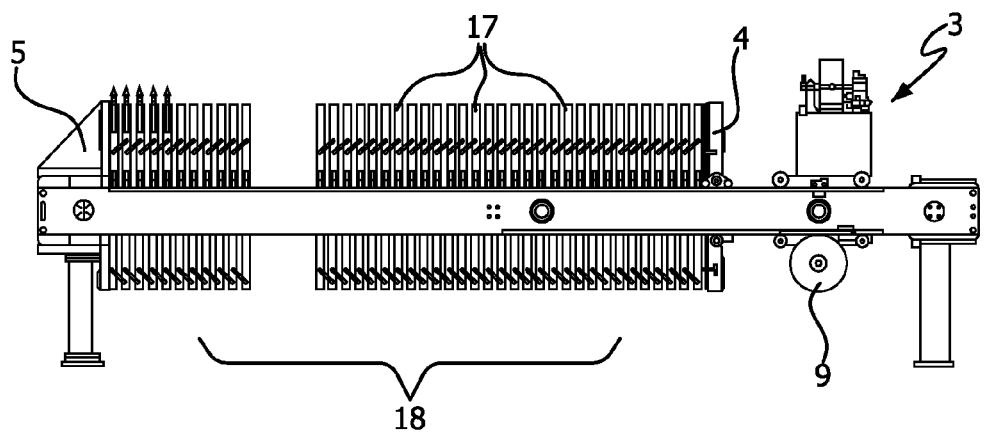
FIG. 5 shows a side view of the embodiment of a filter press according to the invention, as shown in FIG. 1, during rapid emptying.

In order to remove the filter cake upon completion of filtration, the filter plate assembly 18 must then be pulled apart. For this purpose, a control signal to the hydraulic drive 13 first causes the piston of the hydraulic cylinder 11 to retract and thus reduce the closing pressure on the filter plate assembly 18. The stroke length here is short, in the range of 500 mm, thus this process does not take long. A further control signal to the interlocking hydraulics then causes the piston rods of the interlocking cylinders 12 to retract, thus leaving the recesses 6 empty. A corresponding control signal to the hydraulic motor 14 activates the drive unit of the sliding carriage 3 such that the sliding carriage 3 is removed from the header 5 by means of the gear wheels 9 and the toothed rack 7. The outermost filter plate 17 of the filter plate assembly 18 facing the pressure plate 4 is connected to the pressure plate 4, and all other filter plates 17 are connected to this outermost filter plate 17, for example by chains. Thus, the movement of the sliding carriage 3 causes the filter plates 17 in the filter plate assembly 18 to be pulled apart from one another, and the filter cake drops to the floor under the force of gravity (FIG. 5, FIG. 6).

Finally, a further proximity switch detects the position of the sliding carriage 3 in its outermost position farthest away from the header 5—the original starting position—and emits a control signal to brake the sliding carriage 3 via the hydraulic motor 14. When the sliding carriage 3 has come to a standstill and the filter cake has dropped to the floor, the filter press according to the invention is ready for a new cycle.

The filter press according to the invention thus provides the necessary closing pressure for the filter plate assembly 18 on the one hand, but also allows the filter plate assembly 18 to be opened and closed rapidly on the other hand. In addition, the arrangement of the hydraulic drive 13 and the hydraulic cylinder 11, of the interlocking hydraulics 15 for the interlocking cylinders 12, and of the hydraulic motor 14 protects them against contamination. Furthermore, the main supply lines for the hydraulic units can be kept short.

The invention claimed is:

1. A filter press with a press frame containing side beams to support filter plates movably along a longitudinal axis of said side beams, where said filter plates are oriented at right angles to the longitudinal axis of said side beams and said filter plates are connected to one another, and where a pressure plate is provided that can be moved along the longitudinal axis of said side beams by means of a pushing or pulling device, and said pressure plate presses said filter plates against one another during the filtration process, wherein the pushing or pulling device is mounted on a sliding carriage that can be moved on said side beams along the longitudinal axis of said side beams by means of a drive unit mounted on said sliding carriage, and said pushing or pulling device has a hydraulic drive for driving a hydraulic cylinder, where both the hydraulic drive and the hydraulic cylinder are mounted on said sliding carriage.

2. The filter press according to claim 1, wherein said drive unit comprises at least one gear wheel that meshes with at least one toothed rack mounted on said side beams.

3. The filter press according to claim 2, wherein the sliding carriage has at least one interlocking cylinder that interacts with a recess in the side beams in the vicinity of the filter plates in a closed position.

4. The filter press according to claim 2, wherein said filter press has proximity switches mounted in a starting position of the sliding carriage when the filter plates are open and in a final position of the sliding carriage in the vicinity of the filter plates in a closed position.

5. The filter press according to claim 2, wherein the teeth of the toothed rack face downward.

6. The filter press according to claim 5, wherein the sliding carriage has at least one interlocking cylinder that interacts with a recess in the side beams in the vicinity of the filter plates in a closed position.

7. The filter press according to claim 5, wherein said filter press has proximity switches mounted in a starting position of the sliding carriage when the filter plates are open and in a final position of the sliding carriage in the vicinity of the filter plates in a closed position.

8. The filter press according to claim 1, wherein said sliding carriage has at least one interlocking cylinder that interacts with a recess in said side beams in the vicinity of the filter plates in a closed position.

9. The filter press according to claim 8, wherein a limit stop is provided in the vicinity of said filter plates in a closed position.

10. The filter press according to claim 8, wherein the sliding carriage has lateral press rolls that roll along the side of said side beams facing away from said sliding carriage.

11. The filter press according to claim 8, wherein said filter press has proximity switches mounted in a starting position of the sliding carriage when the filter plates are open and in a final position of the sliding carriage in the vicinity of the filter plates in a closed position.

12. The filter press according to claim 9, wherein said filter press has proximity switches mounted in a starting position of the sliding carriage when the filter plates are open and in a final position of the sliding carriage in the vicinity of the closed filter plate assembly.

13. The filter press according to claim 10, wherein said filter press has proximity switches mounted in a starting position of the sliding carriage when the filter plates are open and in a final position of the sliding carriage in the vicinity of the filter plates in a closed position.

14. The filter press according to claim 1, wherein said filter press has proximity switches mounted in a starting position of the sliding carriage when the filter plates are is open and in a final position of the sliding carriage in the vicinity of the filter plates in a closed position.

15. The filter press according to claim 1, wherein said hydraulic drive includes a hydraulic motor for driving said hydraulic cylinder.

16. The filter press according to claim 15, wherein said sliding carriage is self-contained such that said hydraulic motor, said hydraulic cylinder and said drive unit are mounted on said sliding carriage.

17. The filter press according to claim 16, wherein a plurality of wheels connected to said sliding carriage engage said side beams to allow for movement of said sliding carriage on said side beams.

18. A filter press, comprising:
   a press frame including side beams;
   a plurality of filter plates movably supported along a longitudinal axis of said side beams, said filter plates being oriented substantially perpendicularly to said longitudinal axis of said side beams and said filter plates being connected to one another;
   a sliding carriage movable on said side beams along said longitudinal axis of said side beams;
   a first drive assembly including a hydraulic drive for driving a hydraulic cylinder, said hydraulic drive and said hydraulic cylinder being mounted on said sliding carriage;
   a second drive assembly mounted on said sliding carriage for moving said sliding carriage, said second drive assembly including at least one gear wheel meshing with at least one toothed rack mounted on said side beams; and
   a pressure plate movable along said longitudinal axis of said side beams by said first drive assembly, said pressure plate pressing said plurality of filter plates against one another during a filtration process.

19. The filter press according to claim 18, wherein the sliding carriage has at least one interlocking cylinder that interacts with a recess in the side beams in the vicinity of said plurality of filter plates in a closed position.

20. The filter press according to claim 19, wherein said sliding carriage has lateral press rolls that roll along a side of said side beams facing away from said sliding carriage.

21. The filter press according to claim 18, wherein said filter press has proximity switches mounted in a starting position of said sliding carriage when said plurality of filter plates are in an open position and in a final position of said sliding carriage when said plurality of filter plates are in a closed position.

22. The filter press according to claim 18, wherein said hydraulic drive includes a hydraulic motor for driving said hydraulic cylinder.

23. The filter press according to claim 22, wherein said sliding carriage is self-contained such that said hydraulic motor, said hydraulic cylinder and said second drive assembly are mounted on said sliding carriage.

24. The filter press according to claim 23, wherein a plurality of wheels connected to said sliding carriage engage said side beams to allow for movement of said sliding carriage on said side beams.

\* \* \* \* \*